(12) United States Patent
Singh

(10) Patent No.: US 10,009,275 B1
(45) Date of Patent: Jun. 26, 2018

(54) UNIFORM ROUTE DISTRIBUTION FOR A FORWARDING TABLE

(71) Applicant: Amazon Technologies, Inc., Seattle, WA (US)

(72) Inventor: Bijendra Singh, Cedar Park, TX (US)

(73) Assignee: Amazon Technologies, Inc., Seattle, WA (US)

(*) Notice: Subject to any disclaimer, the term of this patent is extended or adjusted under 35 U.S.C. 154(b) by 22 days.

(21) Appl. No.: 15/352,442

(22) Filed: Nov. 15, 2016

(51) Int. Cl.
*H04L 12/741* (2013.01)
*H04L 12/721* (2013.01)
*H04L 12/713* (2013.01)
*H04L 12/947* (2013.01)

(52) U.S. Cl.
CPC ............ *H04L 45/745* (2013.01); *H04L 45/14* (2013.01); *H04L 45/586* (2013.01); *H04L 49/252* (2013.01)

(58) Field of Classification Search
CPC . H04W 8/26; H04W 52/226; H04W 63/0485; H04L 1/0043; H04L 1/0052; H04L 49/252; H04L 29/06585; H04L 29/12009; H04L 45/72; H04L 45/74; H04L 45/745; H04L 61/10; H04L 61/20; H04L 61/2092; H04L 61/25
See application file for complete search history.

(56) References Cited

U.S. PATENT DOCUMENTS

| 6,173,384 | B1* | 1/2001 | Weaver ............. G06F 17/30949 370/229 |
| 6,987,732 | B2 | 1/2006 | Gracon et al. |
| 7,046,687 | B1 | 5/2006 | Brown et al. |
| 8,279,867 | B2 | 10/2012 | Carley |
| 8,797,877 | B1 | 8/2014 | Perla et al. |
| 9,473,408 | B1 | 10/2016 | Kabbani et al. |
| 2007/0237074 | A1 | 10/2007 | Curry |
| 2009/0234908 | A1 | 9/2009 | Reyhner et al. |
| 2011/0069711 | A1 | 3/2011 | Jha et al. |
| 2012/0155468 | A1* | 6/2012 | Greenberg ............ H04L 45/24 370/392 |
| 2013/0156036 | A1* | 6/2013 | Basso .................... H04L 69/22 370/392 |
| 2017/0005931 | A1 | 1/2017 | Mehta et al. |
| 2017/0346737 | A1* | 11/2017 | Previdi ................ H04L 45/308 |

OTHER PUBLICATIONS

U.S. Appl. No. 15/187,486, filed Jun. 20, 2016, Titled: Congestion Avoidance in Multipath Routed Flows.
U.S. Appl. No. 15/232,727, filed Aug. 9, 2016, Titled: Congestion Avoidance in Multipath Routed Flows Using Virtual Output Queue Statistics.
U.S. Appl. No. 15/234,996, filed Aug. 11, 2016, Titled: Load Balancing for Multipath Group Routed Flows by Re-Routing the Congested Route.
U.S. Appl. No. 15/235,007, filed Aug. 11, 2016, Titled: Load Balancing for Multipath Groups Routed Flows by Re-Associating Routes to Multipath Groups.

* cited by examiner

*Primary Examiner* — Ashley Shivers
(74) *Attorney, Agent, or Firm* — Kilpatrick Townsend & Stockton LLP

(57) ABSTRACT

Disclosed are techniques for determining lookup value(s) for each of a plurality of network packets. The lookup value can be used to locate a forwarding table storage location(s) for populating or retrieving forwarding information from forwarding table(s). An entropy value of the lookup values can indicate a greater degree of disorder than an entropy value for addresses of the network packets.

20 Claims, 13 Drawing Sheets

UNIFORM ROUTE DISTRIBUTION FOR A FORWARDING TABLE

BACKGROUND

Network devices, such as network switches, are used to transport network packets through computer networks. Network switches can receive network packets and, based on information in each network packet, such as an address, forward the network packet to an appropriate external network device. Network switches are commonly optimized for use in networks, such as the internet, wherein addresses of received network packets are assumed to be sufficiently randomized. When used in datacenters, addresses of network packets may not be sufficiently randomized which may lead to inefficient utilization of network switch resources.

Thus, there is need for improvement in the field of network devices.

BRIEF DESCRIPTION OF THE DRAWINGS

Various embodiments in accordance with the present disclosure will be described with reference to the drawings, in which.

DETAILED DESCRIPTION

Figure 1:
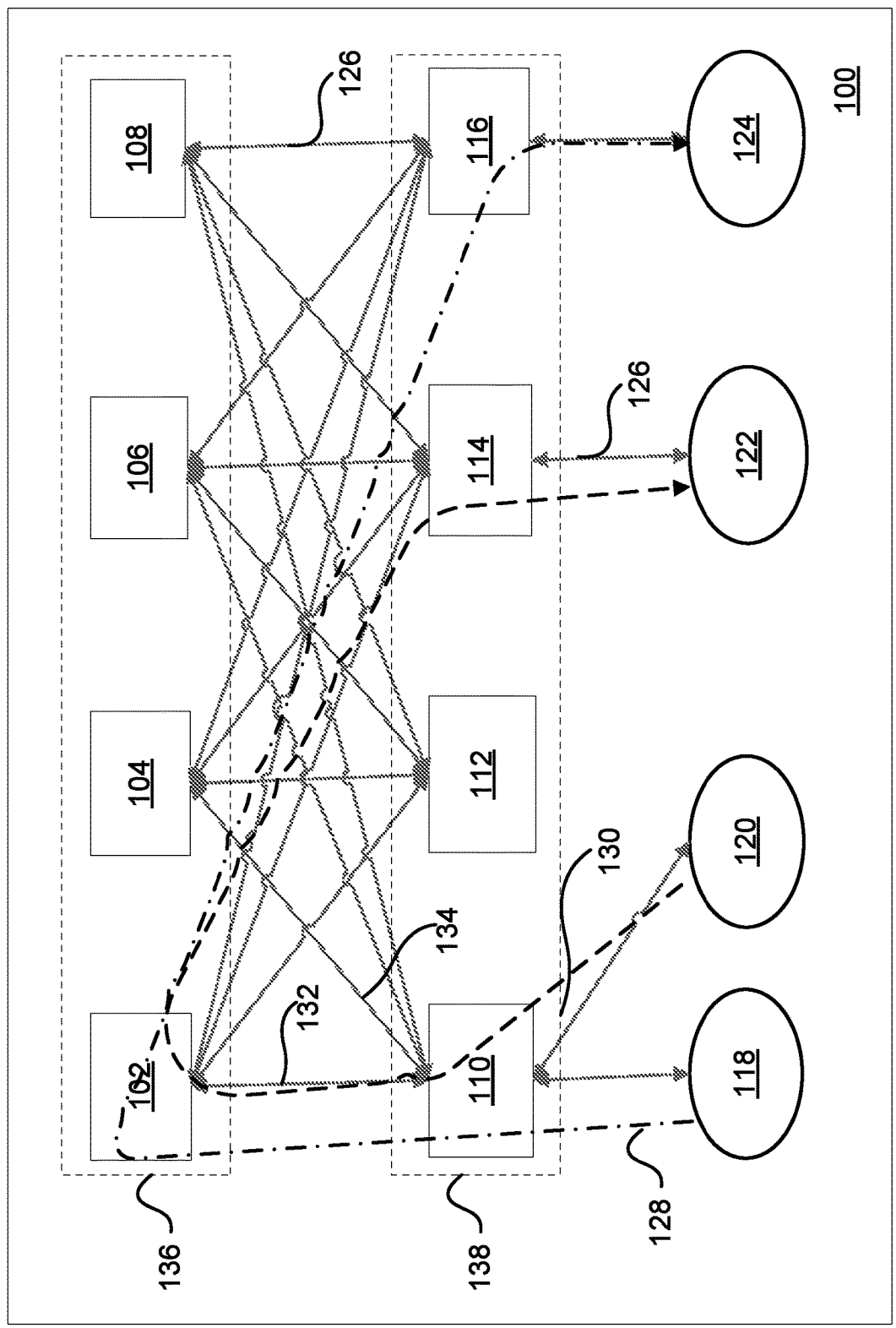
FIG. 1 illustrates an example network infrastructure of a datacenter.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Network devices, such as switches, can be used to forward each of several received network packets to one of several destinations. As network switches advance, so do capabilities of network switches to forward large volumes of network packets at increasingly higher speeds. To support this functionality, many network devices implement network packet processing pipelines and forwarding tables. For example, certain network devices can, depending on an address or other information contained within a network packet, generate lookup value(s) for forwarding table(s) to locate an appropriate destination for forwarding each received network packet. Several different schemas of packet processor(s) and/or corresponding forwarding table (s) can be used to, for example, sequentially and/or concurrently to search for an appropriate destination for each received network packet to optimize speed, memory utilization/size, and/or to minimize dropped packets.

Use of network switches commonly occurs in network environments, such as the internet, wherein many different entities and/or administrators generate network packets that may traverse a network through differing paths. As such, a single network switch can generally receive randomly and/or semi-randomly addressed network packets. Thus, packet processing and forwarding table organization schemas can be optimized for randomly and/or semi-randomly addressed network packets. For example, searching and/or populating forwarding table(s) with destination address(es) can be optimized to distribute forwarding information (e.g., destination, next-hop, interface, or other information for forwarding a network packet) based on receiving network packets with randomized addresses. For example, a packet processor can be configured to search multiple segments of a forwarding table concurrently to expedite selection of an appropriate destination for a received network packet. If the destination addresses are not sufficiently distributed (for example, destination addresses may be condensed within a same segment), then concurrent search schemas may be negatively impacted, and advantages of a concurrent search schema can be, at least partially, nullified.

Datacenter networks present several different challenges as compared to an internet-like network. In a datacenter, computer resources may be assigned addresses by a network administrator, for example, who may have control over assignment of addresses for all devices in the datacenter (or a subset of devices). Thus, in a datacenter, instead of being randomized or pseudo-randomized, addresses may be assigned in discrete sections (sometimes sequentially). As such, it may be difficult for network devices to efficiently populate and generate lookup values for forwarding information using forwarding table(s). For example, in a datacenter network, a forwarding table of a network device may only be populated in discrete areas which may lead to inefficient utilization of memory space and/or search techniques when attempting to locate specific forwarding information for a received network packet.

Disclosed are techniques that can be used to more efficiently utilize network device resources (e.g., forwarding tables and packet processing pipelines) by, for example, pseudo-randomizing network packet information used to lookup forwarding information in a forwarding table. The techniques can be used to increase an entropy value of lookup values used to lookup forwarding information as compared to network devices that don't use the disclosed techniques. Entropy, as used herein, can indicate a degree of order or diversity. For example, received sequential network addresses can be pseudo-randomized and/or range increased to be more distributed when searched and/or stored within a forwarding table. By enhancing distribution of the addresses, forwarding table space can be more efficiently utilized and forwarding table searching can be enhanced (e.g., in terms of speed).

The techniques disclosed include deterministic or pseudo-deterministic generation of lookup values (e.g., the lookup value(s) are entirely determined by the initial state and inputs, which are not random or stochastic, of a network packet). It should be understood that use of a forwarding table can include two differing stages of operation, namely (i) storing and (ii) retrieving. Storing forwarding information for an address can occur before receiving network packets to be forwarded using the forwarding information. After receiving network packets with the address, the forwarding information may then be located. Thus, storing of the forwarding information at the correct location and retrieving the correct forwarding information can require a deterministic technique to generate the appropriate lookup value for a given address.

Example Network Device for a Datacenter

FIG. 1 illustrates a network infrastructure 100 (which can be a private network domain) according to certain embodiments. Network infrastructure 100 includes various network devices, 102-116. Network devices 102-116 can be configured to route network packets transferred between devices 118, 120, 122, and 124. Any of computer devices 118, 120, 122, and 124 can represent host or client side devices (e.g., packets can flow in any direction between the computer devices). Note that computer device 118, 120, 122, and/or 124 can include network interface capabilities for transfer and/or reception of network packets. Various paths 126 are illustrated as connecting the network devices 102-116 and computer devices 118-124.

In network infrastructure 100, network device 110 interfaces to each of network devices 102, 104, 106, and 108. Likewise, each of network devices 112, 114, and 116 interfaces to each of network devices 102, 104, 106, and 108. Thus, network packets can flow directly between any of network devices 102, 104, 106, or 108 to any of network devices 110, 112, 114, or 116. Flow of network packets 128 is illustrated as traversing network infrastructure 100 via path 118-110-102-116-124. Flow of network packets 130 is illustrated as traversing network infrastructure 100 via path 120-110-102-114-122.

When network device 110 receives a network packet from network device 120, it can forward the network packet based on information contained within the network packet (such as a source and/or destination address. For example, the destination of a network packet of flow 130 can indicate that the final destination is computer device 124. Using this information, network device 110 can make a determination that the network packet is to be output to network device 102 as the most efficient next hop destination along its path to ready computer device 124. This determination can be made using various techniques of a network device, as disclosed herein. Furthermore, various techniques can be used to determine optimal paths between network devices for network packets to flow through. These techniques can be dynamic and respond to various network conditions.

In certain embodiments, network infrastructure 100 can be a leaf/spine datacenter network infrastructure. Network devices 102, 104, 106, and 108 can be referred to as a spine layer 136 within network infrastructure 100. Network devices 110, 112, 114, and 116 can be referred to as a leaf layer 138 within network infrastructure. Network infrastructure 100 can be configured such that an equal cost (e.g., with regards to latency) path exists between any two devices of computer devices 118, 120, 122, and 124. In such a topology, paths 126 (including 132 and 134) can represent physical links between network devices within network infrastructure 100.

In certain embodiments, as new host or client devices are added to network infrastructure 100, a new physical link can be connected between the host or client device and a network device of the leaf layer 138. Furthermore, each network device in the spine layer 136 can be organized into panes (e.g., groups of network devices or ports of network devices) within the spine layer 136. Each network device within a pane of spine layer 136 can be associated with one of a group of network devices within leaf layer 138. These example topologies can be used to simplify discovery and formation of multipath groups within network infrastructure 100, enabling network infrastructure 100 to be easily scalable within a datacenter infrastructure environment. Scalability can aid in adapting network infrastructure 100 to accommodate more computing resources (devices 118, 120, 122, or 124) or more intranetwork communication infrastructure (network devices 102-116). The topology of network infrastructure 100 can enable a datacenter infrastructure wherein each device 118-124 can communicate with relatively equal latency any other device 118-124. Multipath groups of network devices within leaf layer 138 can be associated with a pane of network devices within spine layer 136 or network devices within spine layer 136. Addresses assigned to devices 102-124 may be assigned by a network administrator and, as disclosed herein, may be assigned sequentially or semi-sequentially.

Example Packet Processor

Figure 2:
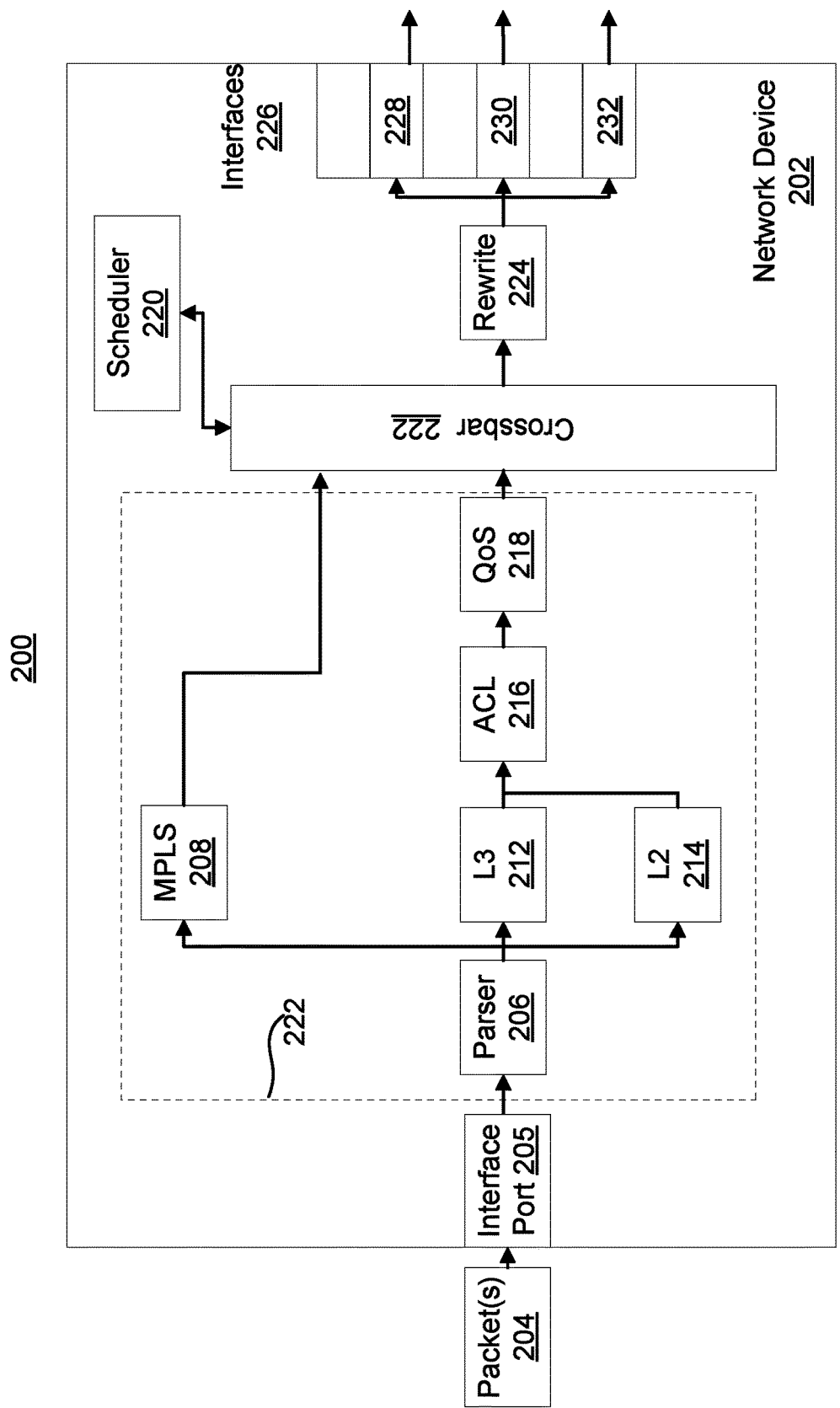
FIG. 2 illustrates an example packet processor.

FIG. 2 illustrates a logical block system 200 illustrating techniques for processing and forwarding of network packets. System 200 can include a network device 202 that can be similar to one of network devise 102-124 and can include a packet processor 222. Packet processor 222 can also be implemented using pipelined operations to support packet processing speeds for high-speed network data transfer operations, including forwarding information lookups and other packet processing operations. Packet processor 222 can be implemented to provide forwarding of network packets as part of the data plane so that forwarding may be performed without software-based techniques.

Network packet(s) 204 can be received via a network interface, such via interface port 205. Interface port 205 can provide a physical layer (PHY) interface. Media Access Control (MAC) layer interface that can be implemented via interface port 205. Network packet(s) 204 can be analyzed to detect valid flows and segment the flow into datagrams (e.g., packets/frames). For instance, the PHY layer may receive and transmit data across physical connections (e.g., such as electrical signals received over twisted-pair coaxial cable or optical signals received over optical fiber). The PHY layer may implement different techniques dependent on the speed or type of network interface configuration (e.g., ethernet 10 base-T, 100 base-TX, and 100 base-T forms), such as encoding, multiplexing, synchronization, clock recovery, and/or data serialization. Various signaling standards, such as IEEE 802.2, may govern the performance of the PHY layer consistent with the open systems interconnection (OSI) model for communications. The MAC layer may delimit frames and packets from the flow of data. Error checking may also be implemented at the MAC layer, checking for different errors, such as frame check sequence (FCS), interframe gap enforcement, and frame preambles.

Packet parser 206 can receive network packets and separate the packet header from the packet payload. Packet parser 206 can parse the packet header to determine and/or extract data for making forwarding decisions for the packet. For example, packet parser 204 can extract different layer headers (e.g., L2 and L2 headers) included in an Internet protocol (IP) version 2 packet, such as the source MAC address, the destination MAC address, the source IP address, the destination IP address, and port numbers. Using information from the layer headers, the network packets can be forwarded to Multiprotocol Label Switching (MPLS) module 208, Level 2 (L2) routing module 212, or Level 2 (L2) routing module 214. MPLS module 208 can use MPLS techniques to make forwarding decisions based on information in the header, bypassing Open System Interconnection (OSI) L2 and L2 routing decisions.

A network packet can be forwarded to L2 routing module 212 or L2 routing module 214 in order to determine forwarding and tunneling decisions based on information in the packet header (e.g., packet metadata) extracted by packet parser 206. For example, L2 routing module 212 can locate appropriate forwarding information through the use of Forwarding Table(s). Forwarding Table(s) can, in certain embodiments, be logically partitioned within L2 routing module 212. In certain embodiments, information can be organized and located in elements of Forwarding Table(s). L2 routing module 214 can perform lookups for data in layer 2 (L2) portions of the packet to perform L2 forwarding. L2 forwarding may access a MAC address table in forwarding tables (not shown) to perform two lookups (which may be in parallel or in series). These forwarding tables can also benefit from features of the disclosure. The first lookup may be performed with a key extracted from the packet header at packet parser 206 (e.g., a VLAN and source MAC address), to determine whether an entry for the packet is present in Forwarding Table(s). If the source MAC address is unknown, then a mapping determination may be made to map the source MAC address to a port identified in the packet header. If the MAC address is known but attached to a different port than indicated the MAC address table, than an operation may be performed to move the source MAC address to the port identified in the packet header. Otherwise, the MAC address is known in the MAC address table. Another look up to the MAC address table may also be performed at another key (the VLAN in the destination MAC address). The network packet may be routed if the MAC address table contains an entry for the destination MAC address owned by a network device (otherwise other operations may be performed, such as trapping the network packet for the CPU, bridging the packet out of a listing interface, or flooded out of all ports and an STP forwarding state).

L2 routing module 212 can perform lookups for data in layer 2 (L2) portions of the packet to perform L2 forwarding. For example, IP headers for the packet may be evaluated respect to entries and tables such as a routing or next top table, to determine forwarding to be performed. The previous examples of packet forwarding is not exhaustive, as many other forwarding systems may be made, including, but not limited to, forwarding for spanning tree protocol (STP) state checking, access port VLAN handling, VLAN membership checking, MAC2ME lookup, broadcast/multicast forwarding to a host CPU for the switch, tunnel start/termination lookup, longest prefix match, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and front/or various other destination resolution lookups. As packet forwarding make forwarding decisions about the packet, the decisions are maintained as packet metadata. The packet metadata can be provided to scheduler 220 for scheduling determinations.

Forwarding Table(s) may be implemented in one or multiple storage devices, such as various memory devices (e.g., a CAM, such as TCAM, and/or random access memory) to store table data for performing different routing decisions. Forwarding Table(s) may include a VLAN table, MAC address table, routing table, adjacency table, next top table, tunnel start table, virtual routing and forwarding identifier table, tunnel termination table, and/or actions table. Each of these different tables may be utilized to retrieve or determine packet forwarding decisions, tunneling decisions, and associated modifications that may need to be made to network packets.

Access Control List module 216 can, based on rules) compare information obtained from a network packet header or elsewhere to make a determination if the network packet header is allowed to be directed to specific destination(s). For example, Access Control List module 216 can include a list of source address(es) of network packets that are allowed to be forwarded to certain address(es). Access Control List module 216 can also include a list of source address(es) of network packets that are not allowed to be forwarded to certain address(es). Additional information can be included within Access Control List module 216 such as protocol version(s), identifying information, or other. After Access Control List module 216 determined whether a specific network packet is approved for forwarding, the network packet can be forwarded to Quality of Service module 218.

Quality of Service module 218 can, based on certain rules, prioritize forwarding of certain network packets over others. For example, certain rules can, based on a QoS policy, can specify that types of packets (such as those associated with video or voice over internet) take priority over other packets (such as for mass file transfers). As another example, a QoS policy can specify that certain users take priority over others. Quality of Service module 218 can withhold certain network packets from proceeding to Crossbar 222. Crossbar 222 can be a switch controlling multiple inputs and multiple outputs. Quality of Service module 218 can comprise multiple queues of output data, each having a different priority. The multiple inputs can each be associated with MPLS module 208, QoS module 218, or other. The multiple outputs can each be associated with an outgoing interface port of Interfaces 226. Illustrated are three example routings of data to interface 228, interface 230, and interface 232 respectively before proceeding to a network device external to network device 202.

Scheduler 220 can control the buffering of packets and scheduling of operations within the network device 202 For example, scheduler 220 can implement a memory management unit to allocate available memory segments for buffering stored packets. Scheduler 220 can also implement a memory management unit to allocate packets from a buffer for final processing and egress. Scheduler 220 can provide the appropriate metadata for a packet. Once a packet has been scheduled, Scheduler 220 can utilize Crossbar 222 and, PHY interface, and/or a MAC layer interface to transmit network packets as network data. Rewrite module 224 can be used to rewrite encapsulation or other information after a packet has traversed crossbar 222, for example. The rewrite module can rewrite encapsulation information to, for example, enable tunneling in the packet, enforce ACL, or appending a next-hop address.

Example Network Device with Hashing

Figure 3:
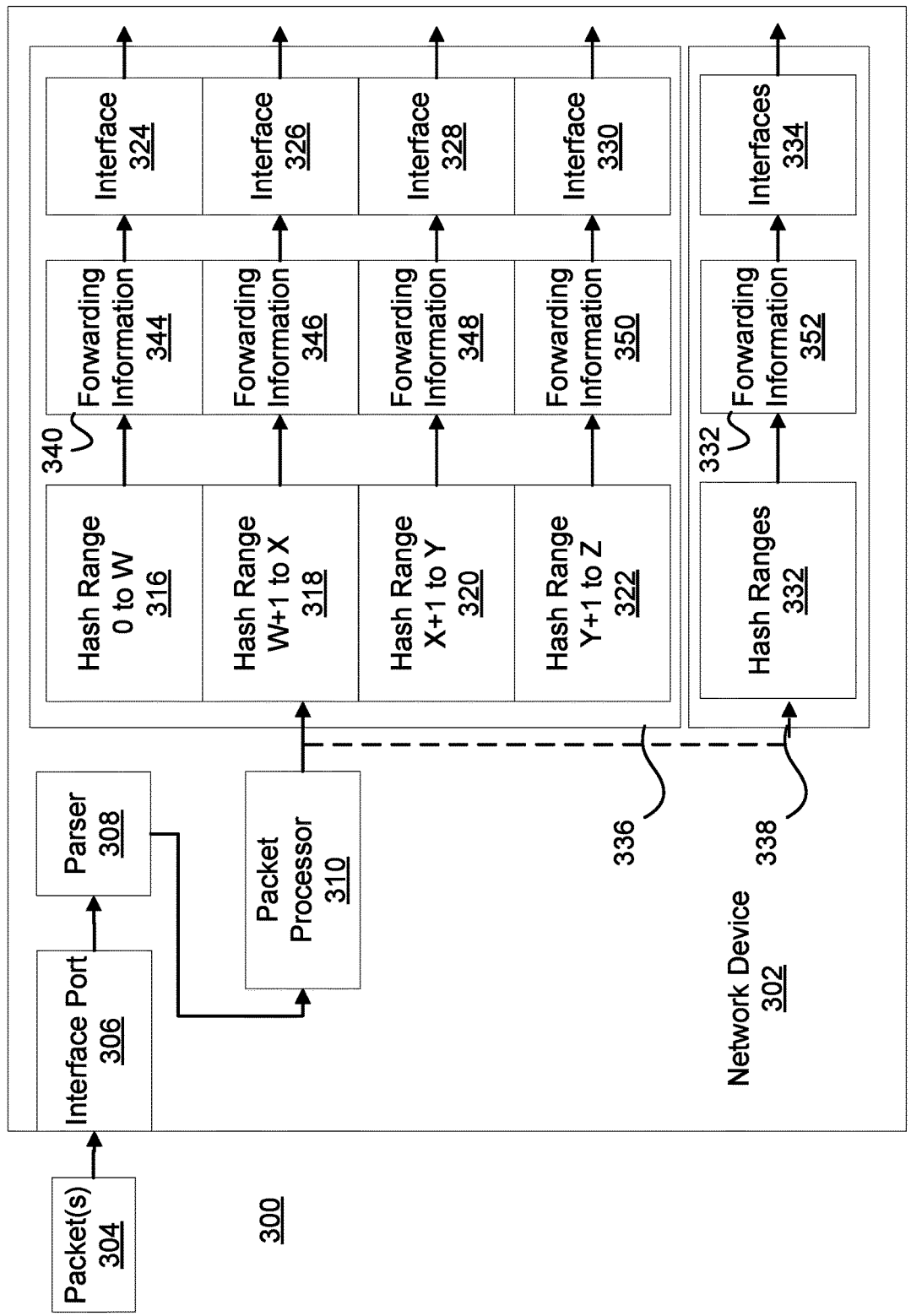
FIG. 3 illustrates an example network device including a packet processor and a forwarding table.

FIG. 3 illustrates a logical diagram of a network device 302 according to certain embodiments. Network device 302 can be similar to network device 202. Packet processor 310 can be similar to packet processor 222. Network device 302 can be a part of a network infrastructure 300. Network device 302 can receive network packet(s) 303 from other network devices (not shown) of network infrastructure 300. Network packet(s) 304 can be received at input interface 306. Network packets 304 can then proceed to parser 308. Parser 308 can parse network packet(s) 304 to obtain information for routing of network packet(s) 304. For example, parser 308 can obtain destination, VLAN, MAC, source and/or destination IP address, virtual forwarding and routing information, or other information that can be parsed in order to determine, by network device 302, a destination address to route network packet(s) 304. Packet processor module 310 can proceed to process network packet(s) 304.

Packet processor 310 can extract and use packet information from network packet(s) 304 to, for example, select a destination address, interface, multipath group, next-hop, or other forwarding information for forwarding of network packet(s) 304. In certain embodiments, forwarding information can be located within one or more forwarding tables. A forwarding table location can be selected from a plurality of location by information determined by packet processor 310. Packet processor 310 can include, for example, hash or other functionality to generate a group identifier and an egress path. Items 308-352 can provide functionality to route network packets to a specific egress interface of a multipath group.

Packet processor 310 is illustrated as selecting one of hash ranges 336 for each of several of network packet(s) 304. Also illustrated is another hash range 338 that could alternatively be selected by routine pipeline 310. Each of hash ranges 336 and 338 includes hash reference ranges 316-322 and 332 respectively. Each Hash reference range is associated with a respective corresponding forwarding information 346-350 and 352 as well as interface 323-330 and 334. In certain embodiments, a hash value of 0x300 may be generated by packet processor 310. Hash reference range 318 may have hash reference ranges of between 0x300 and 0x399, for example. Similarly hash reference range 316 may include hash ranges of between 0x000 and 0x199, for example. In this example, the hash value of 0x300 would fall within hash reference range 318 and not hash reference range 316.

Each of hash reference ranges 316, 318, 320, and 322 can correspond to forwarding information. For example, hash reference range 318 can correspond to forwarding information 346 which can, in turn, correspond to interface 326. Each of interfaces 323, 326, 328, and 330 can indicate an interface port to output network packets. As used herein, the term "hash reference range" for an interface referenced in a multipath group means a range of values associated with an interface such that, if a hash value generated for a network packet falls within the hash reference range for the interface, that interface is selected for that network packet.

Forwarding information 344-352 can be organized into one or more forwarding tables. In certain embodiments, hash values and/or other lookup values can be generated in various combinations. For example, a forwarding table can be organized into a plurality of segments, each segment containing multiple forwarding information values. A first lookup value (such as a hash value) can be generated to select a specific segment. A second lookup value can be generated to locate a specific forwarding information value within a segment. Furthermore, lookup value(s) can be generated in any combination for selecting forwarding table (s), forwarding table segments, or forwarding table entries/locations. In certain embodiments, multiple lookup values can be generated in any combination to, for example, search/select multiple segments of a forwarding table concurrently.

Forwarding Table Organization

Figure 4:
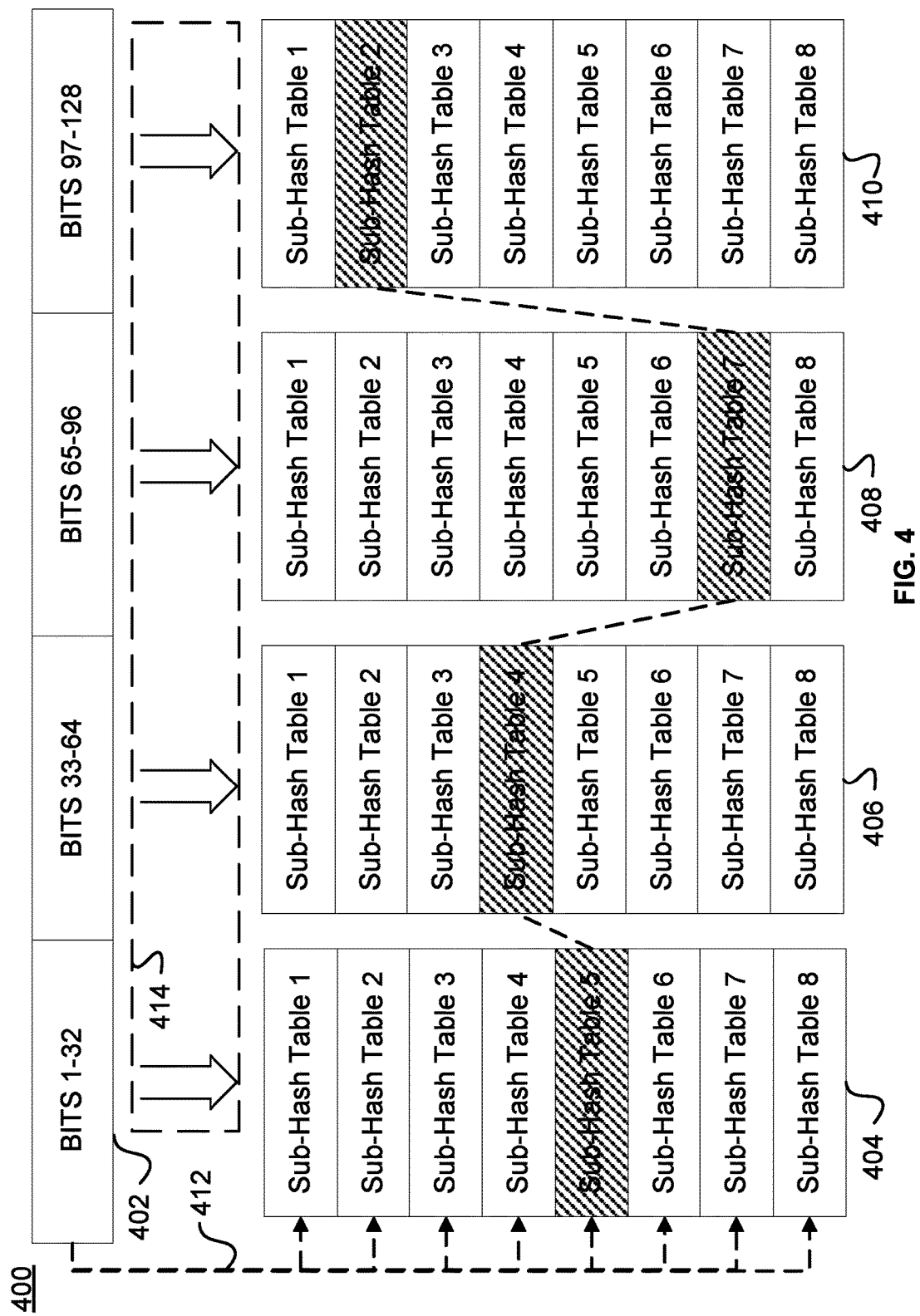
FIG. 4 illustrates features of a packet processor interacting with a forwarding table.

FIG. 4 illustrates a system 400 for locating forwarding information within forwarding table(s). Address 402 can be an address, such as a destination address, of a network packet received by a network device (such as network device 202). Address 402 can be, for example, an IPv6 address comprising 128 bits. An IPv4 address can comprise 32 bits. In certain embodiments, a packet processor can be pipelined to operate on 32 bits of an address at a time. Thus a packet processor can operate on 32 bits of an address sequentially to be able to process an IPv4 or an IPv6 address. As such, an IPv4 address could be processed in a minimum of one stage of a pipeline of a packet processor. An IPv6 address could constitute any number of bits up to the 128 bit maximum and therefore could be processed in one to four stages of a pipeline of a packet processor.

Each stage (and also each 32 bits of an address) can be associated with a separate forwarding table (or portion/segment of a forwarding table). For example, forwarding table 404 is illustrated as being associated with bits 1-32 of address 402 and can therefore contain forwarding information corresponding to bits 1-32 of address 402. Likewise, forwarding table 406 can be associated with bits 33-64, forwarding table 408 can be associated with bits 65-96, and forwarding table 410 can be associated with bits 97-128.

Furthermore, each forwarding table can be segmented into different segments. For example, each of forwarding tables 404-410 is illustrated as including sub-hash table segments 1-8. As illustrated, each of these sub-hash segments can be searched concurrently 412 for a given address/portion of an address. One or more forwarding information entries can be selected from each sub-hash table/entry. In certain embodiments, one forwarding information entry can be selected from a forwarding table (or segment of a forwarding table) that corresponds to a portion of an address. As illustrated, a forwarding table entry can be chained between forwarding tables to obtain a complete forwarding information value for an address. For example, a forwarding entry of sub-hash table 5 of forwarding table 404 can be chained with a forwarding entry of sub-hash table 4 of forwarding table 506 and so on.

A number of bits in address 402 can be used to determine how many forwarding table entries are to be chained together. In certain embodiments, a longest prefix match can be used wherein one or more forwarding table entries are selected that provide a longest forwarding information value for a given address (and thus provide the forwarding value with the highest specificity). As will be described herein, transformation logic can perform a transformation 414 on address 402 (or portions of address 402) to generated lookup value(s) for forwarding table(s), such as tables 404-410.

Example Forwarding Entry Distributions

Figure 5:
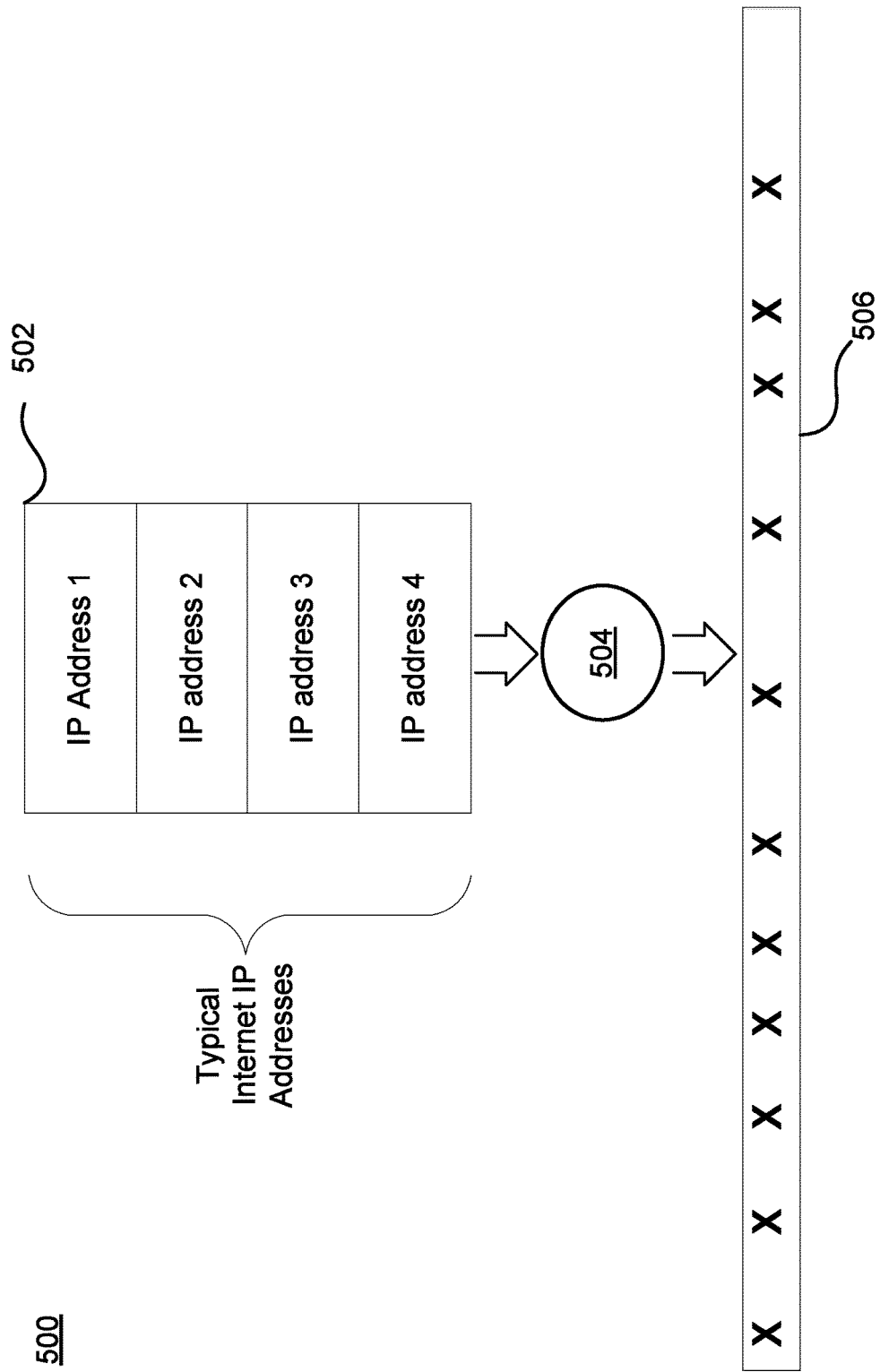
FIG. 5 illustrates an example distribution of values of a forwarding table.
Figure 6:
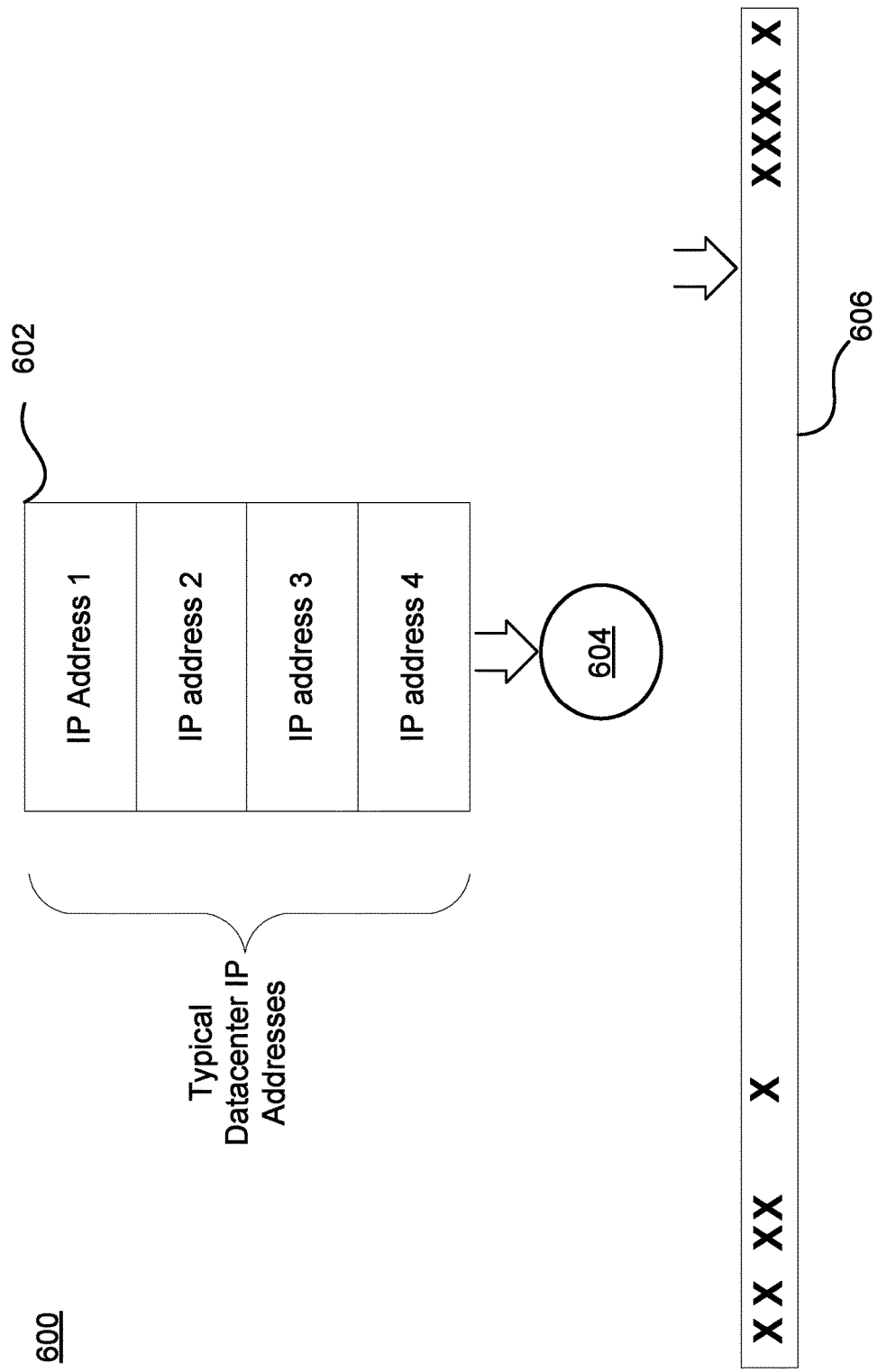
FIG. 6 illustrates an example distribution of values of a forwarding table used in a datacenter.

FIGS. 5 and 6 illustrate distributions of forwarding value entries within a forwarding table (such as forwarding tables 404-410) depending on different addresses of network packets to be forwarded. FIG. 5 illustrates forwarding table usage of a network device 500 that can be used as part of a network such as the internet. Illustrated are a plurality of IP addresses 502 (that can each correspond to a respective network packet received at a network device). The network device can include packet processor 504 to populate and/or location forwarding table 506. As illustrated, if the IP addresses are sufficiently distributed and/or randomized, then forwarding locations can be distributed fairly evenly across forwarding table 506 (used location of forwarding table 506 are illustrated as X's).

FIG. 6 illustrates a case wherein a network device 600 may be used in a datacenter. As disclosed herein, IP addresses 602 may be sequential and/or not sufficiently randomized/distributed. As such, packet processor 604 (which may be similar to packet processor 504), may cluster forwarding table entries within forwarding table 606, as illustrated, into discrete semi-contiguous blocks. As should be understood, forwarding table 606 may be segmented into a plurality of sub-hash tables as illustrated in FIG. 4. The insufficient distribution of forwarding table entries can impact speeds at which forwarding entries are located by preventing parallel searches across multiple forwarding table segments. Furthermore, the insufficient distribution of forwarding table entries may result in inefficient use of memory space assigned to forwarding table 606. For example, certain memory locations may be overridden multiple times whereas other memory locations may go unused.

Route Transformation

Figure 7:
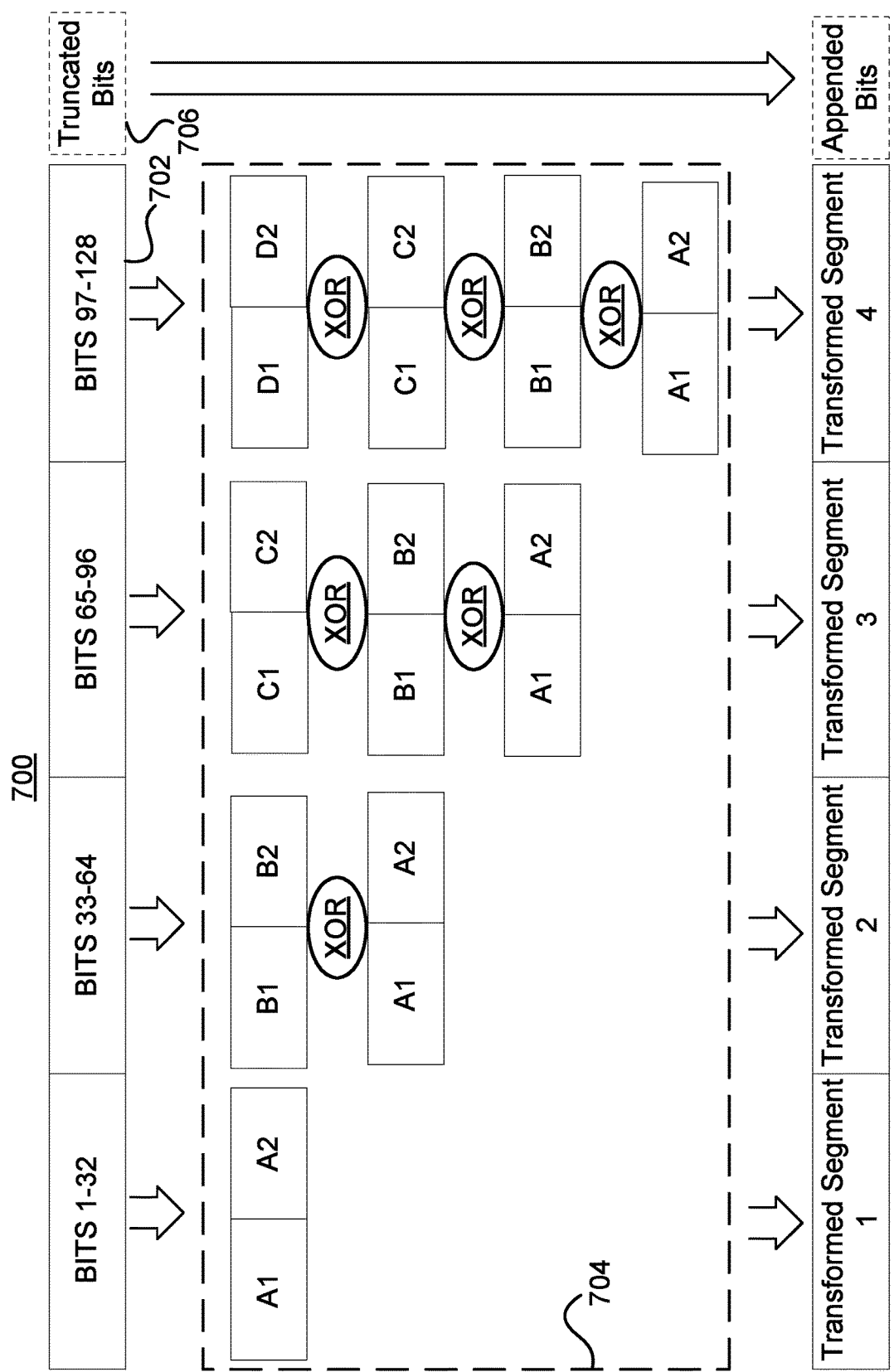
FIG. 7 illustrates example techniques for forwarding table lookup value generation.

FIG. 7 illustrates a system 700 according to certain embodiments that can be used to better distribute forwarding table entries to closer match the distribution of FIG. 5 from the IP addresses of FIG. 6. System 700 can be used to create transformed segment(s) 1-4 that can be used to generate lookup values for a forwarding table (such as via packet processor 310). Transformed segment(s) for network addresses may be associated with a higher entropy value than the network addresses, which may result in better distribution of forwarding table entries. The forwarding table entries can each be stored in a storage location of a forwarding table (e.g., a memory location, index, etc.). System 700 can be included in a network device, such as network device 202 and can be part of a packet processor. As illustrated, system 700 can receive address 702 that can be an IPv4, IPv6, or other address. As disclosed herein, address 702 can be divided into portions (such as 32 bit portions) that are sequentially processed by a packet processor. As illustrated, each 32 bit portion can be further subdivided into sections (illustrated as A1 through D2).

Entropy, as used herein, can indicate a degree of order or diversity (e.g., a degree of patterned locations). Entropy can be defined by the equation $H(X)=-\Sigma_{i=1}^{n}(x_i)\log_b P(x_i)$, wherein $P(x_i)$ is a probability mass function, $x_i$ is a discrete value in a set (such as in a set of lookup values or addresses), n is a total number of members in a set and b is a base. The variable b can be, for example, a 2, 10, or Euler's number e. The probability mass function can indicate how distributed and/or randomized a dataset is. For example, addresses of network devices within a datacenter, as described herein, may be sequentially or otherwise assigned such that their probability distribution indicates that they are not well distributed. A flat probability distribution can indicate that addresses are well distributed across a range of values.

As illustrated in module 704, system 700 can perform exclusive OR operations on portion(s) of an address 702 to transform address 702. For example, Transformed segment 2 can be a result of exclusively ORing bits 33-64 (i.e., B1 and B2) with bits 1-32 (i.e., A1 and A2). As disclosed herein, address 702 can be of any length (such as between 1 and 128 bits). As such, depending upon a length of address 702, a number of transformations can be performed. For example, if address 702 only contains 30 bits, no exclusive OR operations may be performed. However, if address 702 is greater than 32 bits, then results from a previous stage of a pipeline can be forwarding to the next stage for further transformation (e.g., transformed segment 2 can be forwarded to a third stage of a pipeline to be exclusively ORed with bits 65-96 (i.e., C1 and C2).

In certain embodiments, certain multiples of bits (such as multiples of 4 bits) may be exclusively ORed to simplify circuit design. As such, in certain embodiments, some bits 706 may be separated from the address that are in excess of a multiple of bits (such as a multiple of 4 bits). These excess bits can be appended to transformed segment(s). It should be understood that the collection of transformed segments can form a transformed address.

Although FIG. 7 illustrates use of an exclusive OR operation, it should be understood that may different operations may be performed that are deterministic or semi-deterministic. For example, exclusive ORing may be considered semi-deterministic because it can result in a same resultant value for two different inputs (e.g., A XOR B can equal B XOR A). However, by exclusively ORing a first portion of an address with a second portion of an address (especially when the first portion is a subset of the second portion), a unique transformed address can be generated from an input address.

Exclusively ORing address(es) as disclosed herein can result in deterministic forwarding table lookup values. Take, for example, a 64 bit address A1:A2:B1:B2. The resulting transformation of the address can be, as illustrated in FIG. 7, A1:A2:B1 XOR A1:B2 XOR A2. However, assuming generic route Rx:Ry:Rp:Rq is transformed as: Rx:Ry:Rp XOR Rx:Rq XOR Ry. For the two transformed routes to be equal, then:

| | | |
|---|---|---|
| Rx | equals | A1; |
| Rp XOR Rx | equals | B1 XOR A1; |
| Ry | equals | A2; and |
| Rq XOR Ry | equals | B2 XOR A2. |

Assuming that Rx equals A1, then Rp equals B1 because substituting A1 for Rx yields Rp XOR A1 which can be compared to B1 XOR A1. Thus, Rp equals A1. Similarly, assuming that Ry equals A2, then Rq equals B2 because substituting A2 for Ry yields Rq XOR A2 which can be compared to B2 XOR A2. Thus, Rq equals B2. As such, A1:A2:B1 XOR A1:B2 XOR A2 equals Rx:Ry:Rp XOR Rx:Rq XOR Ry and the two routes can be the same after the exclusive OR transformation disclosed only if the two original routes are the same. Therefore, the transformation is unique and results in a unique resultant.

Virtual Routing and Forwarding Information Integration

Figure 8:
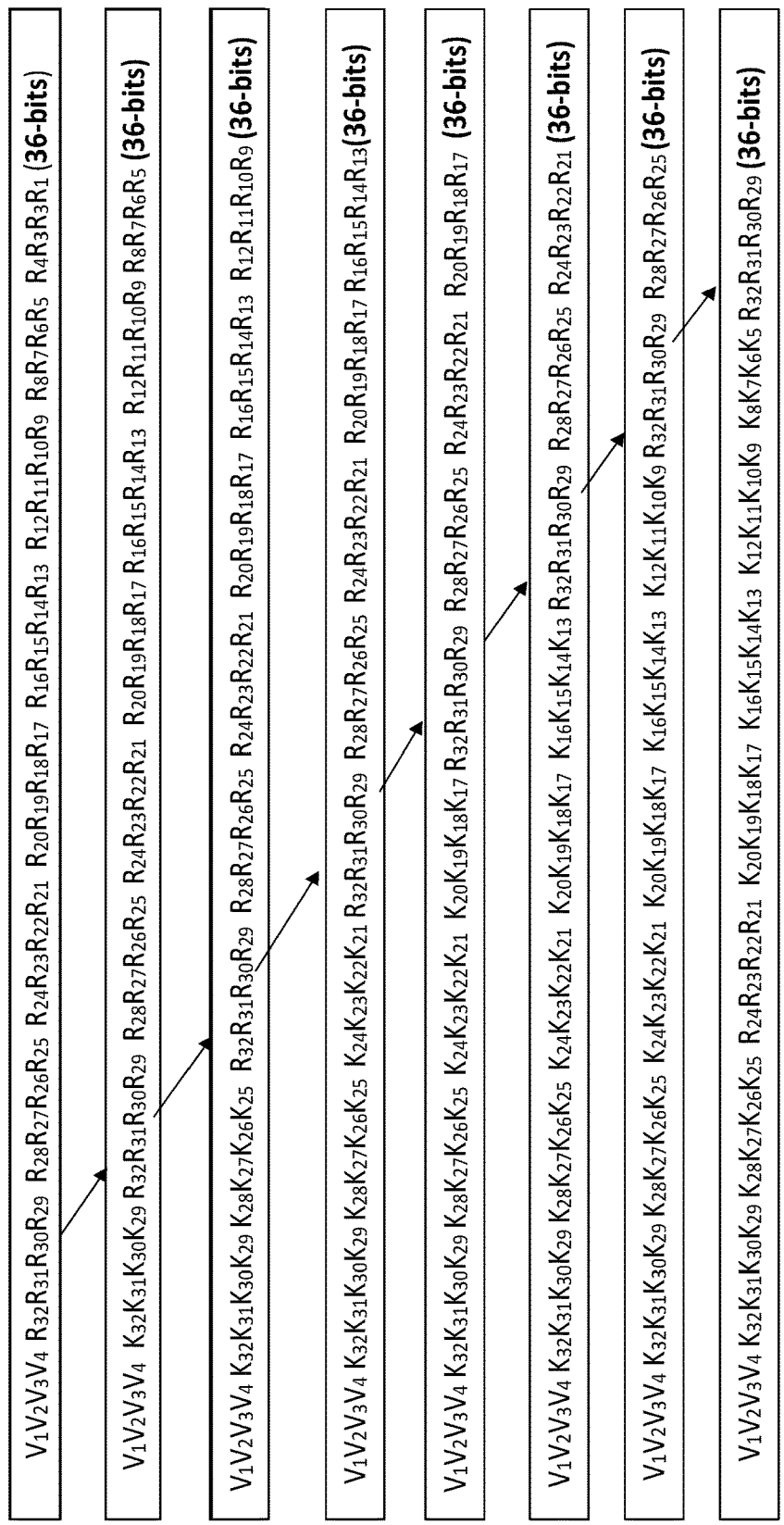
FIG. 8 illustrates further example techniques for forwarding table lookup value generation.

FIG. 8 illustrates techniques to further distributed and/or randomize lookup values for a forwarding table. Illustrated are several portions of routes of differing lengths that may or may not be transformed using the exclusive OR techniques disclosed. For example, routes of less than 32 bits may not be transformed using the exclusive OR techniques. However, they may be transformed using virtual routing and forwarding information, as illustrated. For example, each 32 bit segment of an address can be appended with 4 bits from virtual routing and forwarding information (illustrated here as bits V1, V2, V3, and V4) which can be considered to be relatively random. Depending on the size of the address (illustrated here as bits Rx wherein x is a variable), a certain number of constant value bits (illustrated here as bits Kx wherein x is a variable) can be appended between the virtual routing and forwarding bits and the route bit. Thus, a portion of an address can be transformed using virtual routing and forwarding information to improve distribution of the lookup value(s). Furthermore, each of the route bits are illustrated as being a multiple of four bits. As disclosed herein, extra bits may be appended from the address that remain from a multiple of four. Furthermore, an address or address portion may or may not be transformed using the exclusive OR techniques disclosed herein.

In certain embodiments, multiple lookup value can be generated for a singular address. For example, a 32 bit address may be used to generated 8 different lookup values (each corresponding to a row illustrated in FIG. 8). As disclosed herein, each row may correspond to a 4 bit multiple of an address. For example, a lookup value can be generated for each of a 4, 8, 12, 16, 20, 24, 28, and 32 bit portion of an address (and can use virtual routing and forwarding information as illustrated). Each of the lookup values can correspond to a respective forwarding table and/or segment of a forwarding table. Furthermore, a lookup value can be generated that points to a specific forwarding table entry address/location within each forwarding table and/or segment of a forwarding table.

In certain embodiments, when populating a forwarding table, a plurality of locations and/or segments can be generated as disclosed in the previous paragraph. The first location may be a primary location and the remaining may be alternate location(s). For example, a primary location may already be populated by another value. If so, an alternate location may be populated with forwarding information for an input address used to generate the location(s).

In certain embodiments, three values can be generated for each segment of a forwarding table (or for each sub-hashtable/forwarding table). For example, a segment identifier can be generated to indicate which segment the three values correspond to. A second value can be an index into the segment indicating as to which location with the segment should be populated and/or searched. The third value can be a key used to compare to contents of the location. For example, as disclosed herein, multiple segments can be searched concurrently (to locate specific forwarding information or to populate with forwarding information). Note that each segment can be associated with a different index. The key can be used to determine which location contains the desired forwarding information. The three values (segment identified, index, and key) can be considered a tuple. In certain embodiments, a number of tuples can be generated for each portion of an address. The number of tuples for each portion can equal a number of forwarding tables (or forwarding table segments) to be searched concurrently.

The following is example software code for implementing generation of lookup values for an IPv4 input address:
Inputs:
1) IPv4 Route (the original input route), of format [X.Y.Z.K],
2) Route Length PrefixLength,
3) VRF ID=VrfID, (virtual routing and forwarding information)
4) Number of maximum segments that a 32-bits route is broken into called IPv4MaxPrefixSegmentCount (e.g., the number of forwarding table segments)
CalculateTableID(Route, PrefixLength, VrfID, IPv4MaxPrefixSegmentCount)
{
uint8_t VrfDigest=VrfDigestFunction(VrfID); /*generates 4-bit VRF-Digest from input VrfID*/
uint8_t RouteMsbByte=X/*extract the most significant byte from route [X.Y.Z.K/P] by performing operation "right-shift-by-24" on the input route and taking the result, which is the msb-byte*/
uint8_t TableIDCalculationDigest=(((VrfDigest<<4) & 0xf) ^RouteMsbByte); /*Place 4-bit VrfDigest value in the msb-4-bits of a byte by left-shifting it by 4, and XOR it with RouteMsbByte value*/
if(PrefixLength>4) {
uint8_t XorValue=(((TableIDCalculationDigest>>4) & 0xf) ^((TableIDCalculationDigest & 0xf))); /*">>"=bitwise right-shift operation, "0"=bitwise-exclusive-OR operation*/
uint8_t Prefix4RegularValue=(((TableIDCalculationDigest>>4) & 0xf) % IPv4MaxPrefixSegmentCount); /*"&"=bitwise AND operation*/
uint8_t Prefix4ExtendedValue=((XorValue+(4/4−1)) % IPv4MaxPrefixSegmentCount); /*"%"=modulo operation*/
uint8_t PrefixValue=((XorValue+((PrefixLength/4)−1)) % IPv4MaxPrefixSegmentCount);
if(Prefix4RegularValue==PrefixValue) {/*"="is assignment operation, "=="is equal-to operation*/
return Prefix4ExtendedValue;
else {
return PrefixValue;
}
else {
return((((TableIDCalculationDigest>>4) & 0xf)+((PrefixLength/4)−1)) % IPv4MaxPrefixSegmentCount);
}
}

Figure 9:
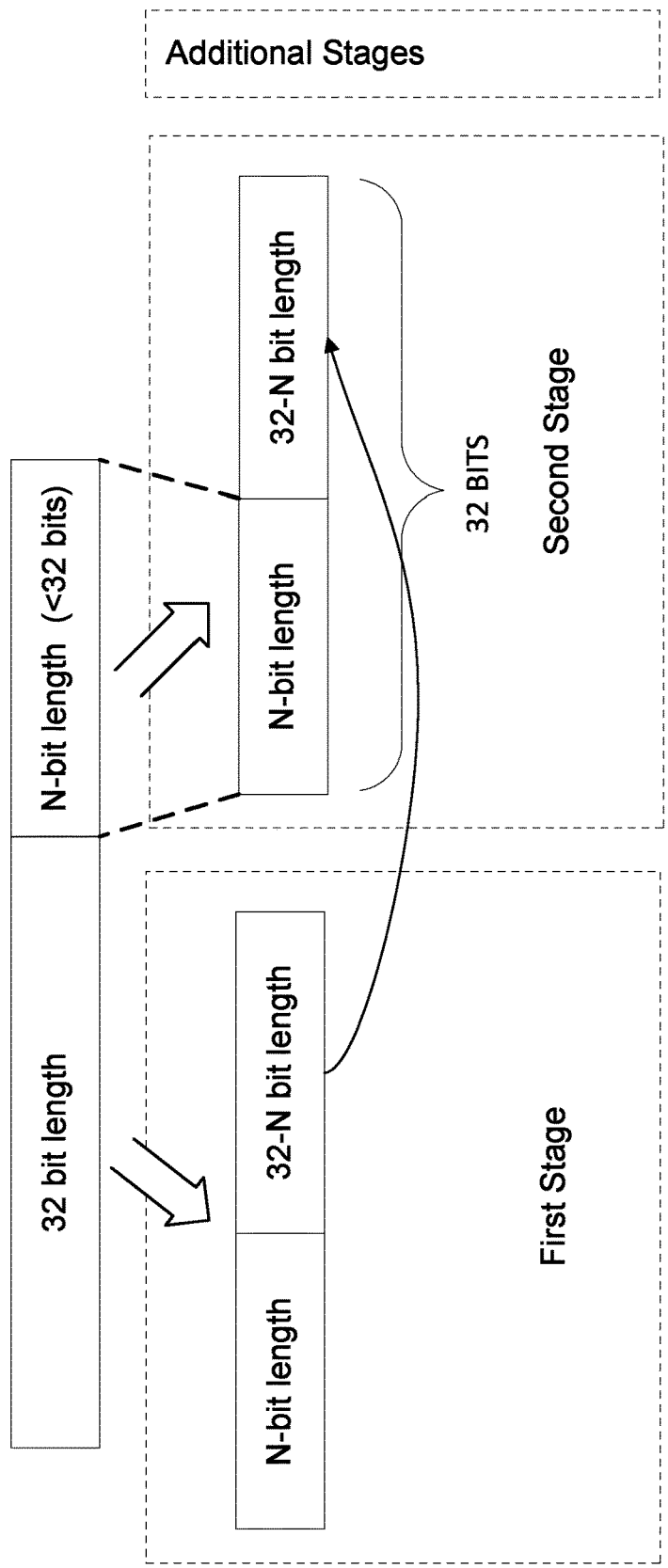
FIG. 9 illustrates further example techniques for forwarding table lookup value generation including route tail substation.

The following is example software code for implementing generation of lookup values for an IPv6 input address:
Inputs:
1) IPv6 Transformed Route, of the format [A1:A2:B1:B2:C1:C2:D1:D2::/128],
2) Route Prefix P and RouteMsbByte computed for each IPv6 state I, II, III and IV,
3) VRF ID=VrfID,
4) Number of maximum prefix segments a 32-bits route segment is broken into called IPv6MaxPrefixSegmentCount (for each of IPv6 stages I, II, III and IV)
CalculateTableID(Route, PrefixLength, VrfID, IPv6MaxPrefixSegmentCount)
{
uint8_t VrfDigest=VrfDigestFunction(VrfID); /*generates 4-bit VRF-Digest from input VrfID*/
uint8_t RouteMsbByte=[Computed using the algorithm described on previous slide for specific IPv6 stage.]
uint8_t TableIDCalculationDigest=(((VrfDigest<<4) & 0xf) ^RouteMsbByte); /*Place 4-bit VrfDigest value in the msb-4-bits of a byte by left-shifting it by 4, and XOR it with RouteMsbByte value*/
if(PrefixLength>4)
uint8_t XorValue=(((TableIDCalculationDigest>>4) & 0xf) ^((TableIDCalculationDigest & 0xf)));
uint8_t Prefix4RegularValue=(((TableIDCalculationDigest>>4) & 0xf) % IPv6MaxPrefixSegmentCount);
uint8_t Prefix4ExtendedValue=((XorValue+(4/4−1)) % Pv6MaxPrefixSegmentCount);
uint8_t PrefixValue=((XorValue+((PrefixLength/4)−1)) % Pv6MaxPrefixSegmentCount);
if(Prefix4RegularValue==PrefixValue)
return Prefix4ExtendedValue;

```
}else{
return PrefixValue;
}
}else{
return((((TableIDCalculationDigest>>4) & 0xf)+((Prefix-
   Length/4)-1)) % IPv6MaxPrefixSegmentCount);
}
}
```
Route-Tail Substitution FIG. 9 illustrates techniques for further improving distribution of generated forwarding values, especially for stages two through four of a packet processor processing an IPv6 address. The techniques of FIG. 9 can be used to supplement the techniques illustrated in FIG. 8. For example, the techniques of FIG. 8 can be used to generate lookup value(s) for an IPv4 or a first stage of an IPv6 address. The techniques of FIG. 9 can be used to supplement generation of lookup value(s) in subsequent stages of a packet processor.

As disclosed herein, each stage of a packet processor pipeline can include 32 bits. However, an address can be of any length, 37 bits for example, wherein 5 bits can be processed during a second stage. The techniques of FIG. 9 can be used to append more bits to the 5 bits of the second stage to improve distribution of generated forwarding values. As illustrated, a certain stage can have N-bits (such as the 5 bits given as an example previously). The remaining bits of the stage can be filled in from a previous stage. For example, 27 bits can be pulled from the previous stage and appended to the 5 bits to complete a 32 bit value. This technique can be performed for any stage after the first stage (as the first stage does not have a previous stage).

Reverse Vector Chaining

Figure 10:
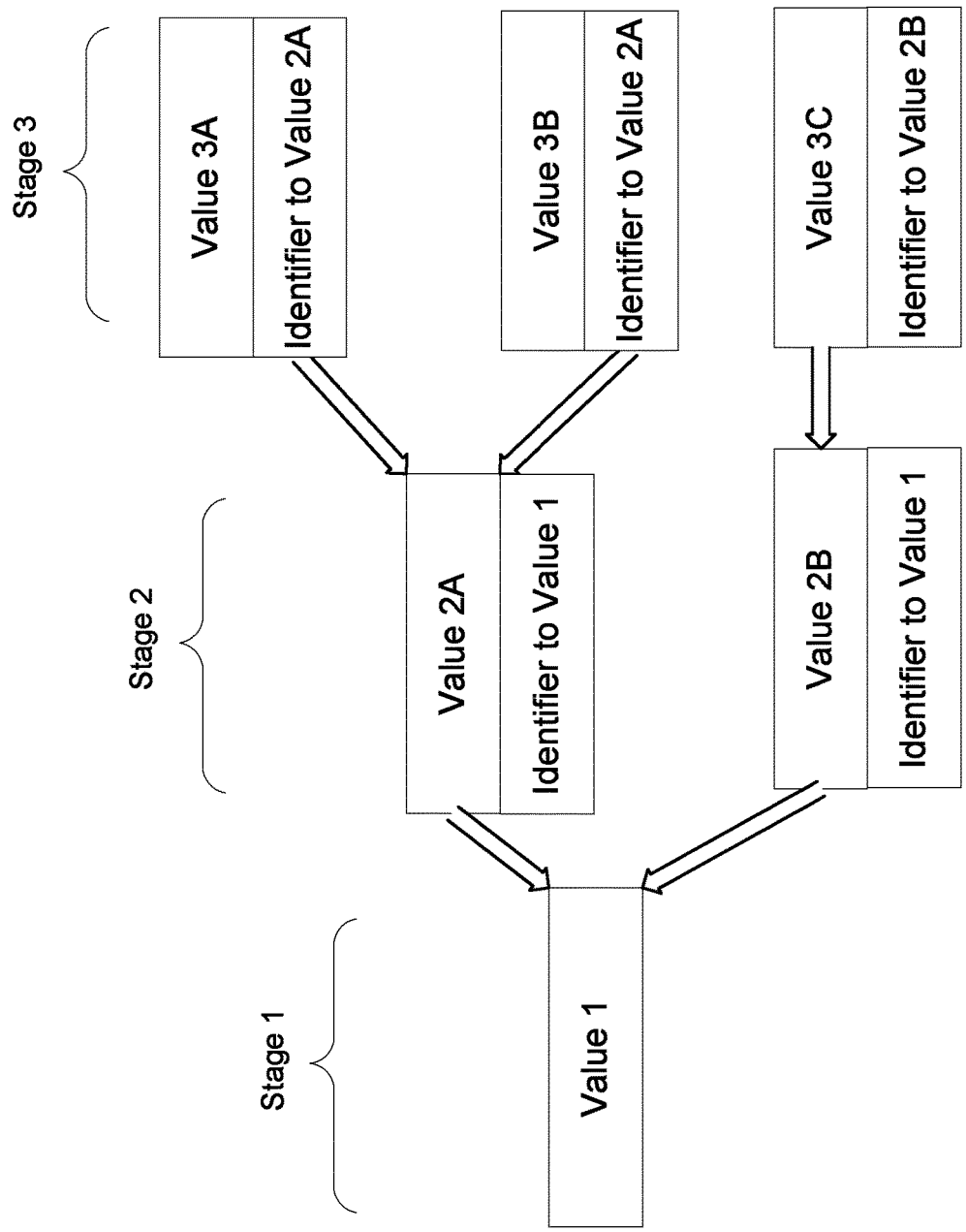
FIG. 10 illustrates further example techniques for forwarding table lookup value generation including reverse vector chaining.

FIG. 10 illustrates techniques of reverse vector chaining. Reverse vector chaining can be used to correctly string together different subunits of an overall transformed forwarding table lookup value that are each stored within a different forwarding table or segment of a forwarding table. In certain embodiments, an overall lookup value may be deterministic for a given input, but each subunit may not. For example, assume that two different addresses are to be searched/populated in forwarding table(s). The two addresses can be:

R1: 2001:2002:2003:2004:2005:2006:2007:2008
   R2: 2003:2004:2001:2002:2005:2006:2007:2008

If so, then the subunit inputs to the second stage of a packet processor disclosed herein can respectively be 2001:2002 XOR 2003:2004 and 2003:2004 XOR 2001:2002 (e.g., the lookup values may be the same for a specific stage even though the two different addresses are unique and different). This effect is illustrated in FIG. 10 by forwarding information of Stage 2A and forwarding information of Stage 2B pointed back to forwarding information of stage 1. Reverse vector chaining is a technique to uniquely associate an identifier indicated forwarding information of stage 1, for example, with either of forwarding information of Stage 2A or forwarding information of stage 2B. For example, one or more tuples can be stored corresponding to forwarding information of Value 1 with forwarding information of Value 2A or Value 2B to uniquely link either Value 2A or Value 2B with Value 1. Thus, identifier(s) can be used to link the forwarding information of different stages of a packet processor pipeline together.

As illustrated in FIG. 4, forwarding information from two different sections of forwarding table(s) can be linked together to obtain more precise forwarding information. As disclosed, longest prefix match techniques can be used to select one such "assembled" value from multiple values, the selected value having the more precise forwarding information. Reverse vector chaining can aid in correctly piecing together forwarding information in the correct order to assemble forwarding information in the correct order for a given input address.

Methods of Certain Embodiments

Figure 11:
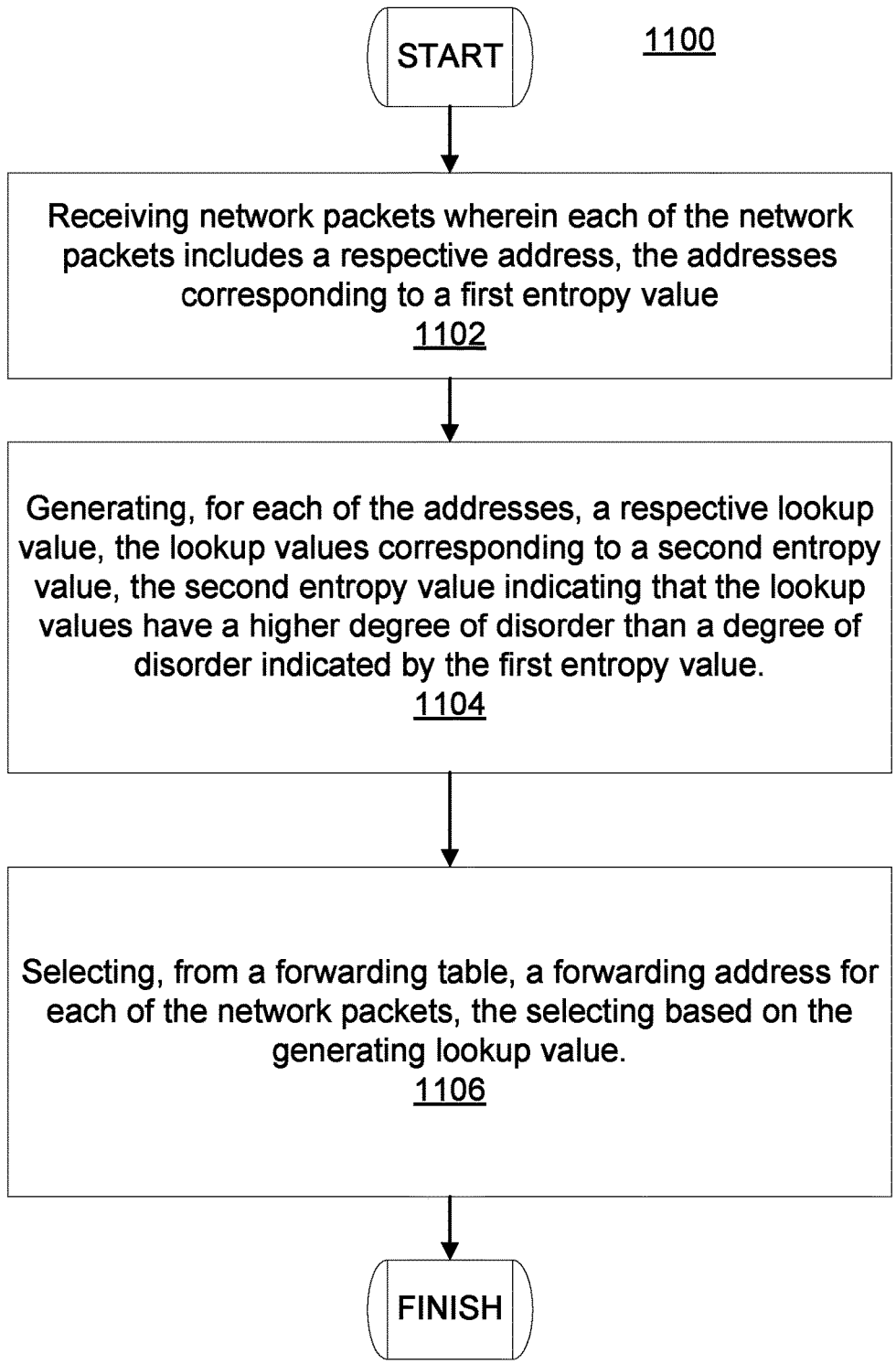
FIG. 11 illustrates an example flowchart for implementing features of certain embodiments.

FIG. 11 illustrates an example flowchart 1100 for implementing features of certain techniques of the disclosure. For example, at 1102, network packets can be received by a network device, such as network device 202. Each of the network packets can include a respective address. The addresses can correspond to a first entropy value. At 1104, a respective lookup value can be generated for each of the addresses. A second entropy value can correspond to the generated lookup values and can indicate that the lookup values have a higher degree of disorder than a degree of disordered indicated by the first entropy value for the addresses. At 1106, forwarding address(es) can be selected from forwarding table(s) for each of the network packets based on the generated lookup values.

Computing Systems

Figure 12:
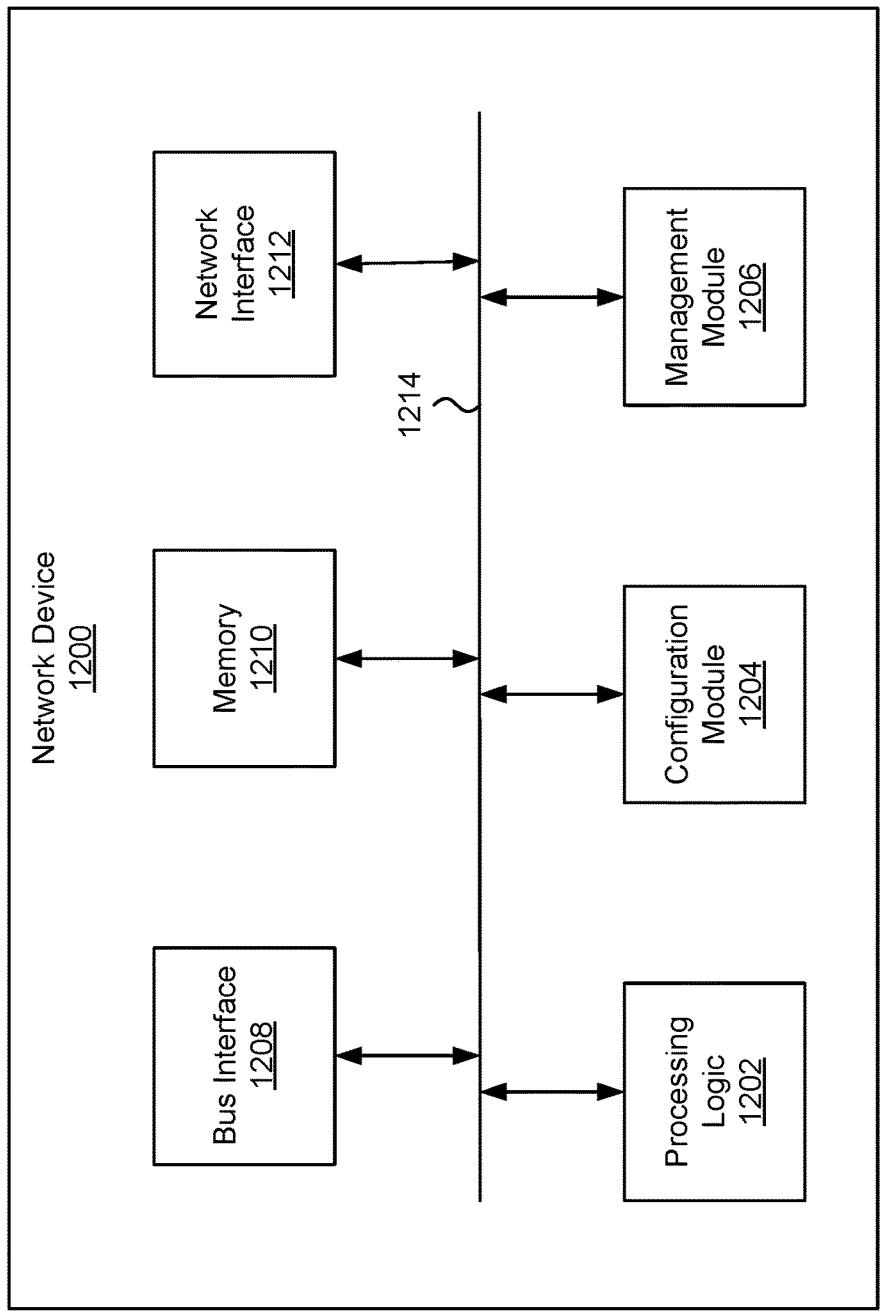
FIG. 12 illustrates an example of a network device, according to certain aspects of the disclosure.

FIG. 12 illustrates an example of a network device 1200. Functionality and/or several components of the network device 1200 may be used without limitation with other embodiments disclosed elsewhere in this disclosure, without limitations. A network device 1200 may facilitate processing of packets and/or forwarding of packets from the network device 1200 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1200 may be the recipient and/or generator of packets. In some implementations, the network device 1200 may modify the contents of the packet before forwarding the packet to another device. The network device 1200 may be a peripheral device coupled to another computer device, a switch, a router or any other suitable device enabled for receiving and forwarding packets.

In one example, the network device 1200 may include processing logic 1202, a configuration module 1204, a management module 1206, a bus interface module 1208, memory 1210, and a network interface module 1212. These modules may be hardware modules, software modules, or a combination of hardware and software. In certain instances, modules may be interchangeably used with components or engines, without deviating from the scope of the disclosure. The network device 1200 may include additional modules, not illustrated here, such as components discussed with respect to the nodes disclosed in FIG. 13. In some implementations, the network device 1200 may include fewer modules. In some implementations, one or more of the modules may be combined into one module. One or more of the modules may be in communication with each other over a communication channel 1214. The communication channel 1214 may include one or more busses, meshes, matrices, fabrics, a combination of these communication channels, or some other suitable communication channel.

The processing logic 1202 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1202 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1202 may be stored on a computer-readable storage medium, for example, in the form of a computer program. The computer-readable storage medium may be non-transitory. In some cases, the computer-readable medium may be part of the memory 1210.

The memory 1210 may include either volatile or non-volatile, or both volatile and non-volatile types of memory. The memory 1210 may, for example, include random access memory (RAM), read only memory (ROM), Electrically Erasable Programmable Read-Only Memory (EEPROM), flash memory, and/or some other suitable storage media. In some cases, some or all of the memory 1210 may be internal to the network device 1200, while in other cases some or all of the memory may be external to the network device 1200. The memory 1210 may store an operating system comprising executable instructions that, when executed by the processing logic 1202, provides the execution environment for executing instructions providing networking functionality for the network device 1200. The memory may also store and maintain several data structures and routing tables for facilitating the functionality of the network device 1200.

In some implementations, the configuration module 1204 may include one or more configuration registers. Configuration registers may control the operations of the network device 1200. In some implementations, one or more bits in the configuration register can represent certain capabilities of the network device 1200. Configuration registers may be programmed by instructions executing in the processing logic 1202, and/or by an external entity, such as a host device, an operating system executing on a host device, and/or a remote device. The configuration module 1204 may further include hardware and/or software that control the operations of the network device 1200.

In some implementations, the management module 1206 may be configured to manage different components of the network device 1200. In some cases, the management module 1206 may configure one or more bits in one or more configuration registers at power up, to enable or disable certain capabilities of the network device 1200. In certain implementations, the management module 1206 may use processing resources from the processing logic 1202. In other implementations, the management module 1206 may have processing logic similar to the processing logic 1202, but segmented away or implemented on a different power plane than the processing logic 1202.

The bus interface module 1208 may enable communication with external entities, such as a host device and/or other components in a computing system, over an external communication medium. The bus interface module 1208 may include a physical interface for connecting to a cable, socket, port, or other connection to the external communication medium. The bus interface module 1208 may further include hardware and/or software to manage incoming and outgoing transactions. The bus interface module 1208 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1208 may include the physical layer for any of these bus protocols, including a connector, power management, and error handling, among other things. In some implementations, the network device 1200 may include multiple bus interface modules for communicating with multiple external entities. These multiple bus interface modules may implement the same local bus protocol, different local bus protocols, or a combination of the same and different bus protocols.

The network interface module 1212 may include hardware and/or software for communicating with a network. This network interface module 1212 may, for example, include physical connectors or physical ports for wired connection to a network, and/or antennas for wireless communication to a network. The network interface module 1212 may further include hardware and/or software configured to implement a network protocol stack. The network interface module 1212 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1200 may include multiple network interface modules, each configured to communicate with a different network. For example, in these implementations, the network device 1200 may include a network interface module for communicating with a wired Ethernet network, a wireless 802.11 network, a cellular network, an Infiniband network, etc.

The various components and modules of the network device 1200, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 13.

Figure 13:
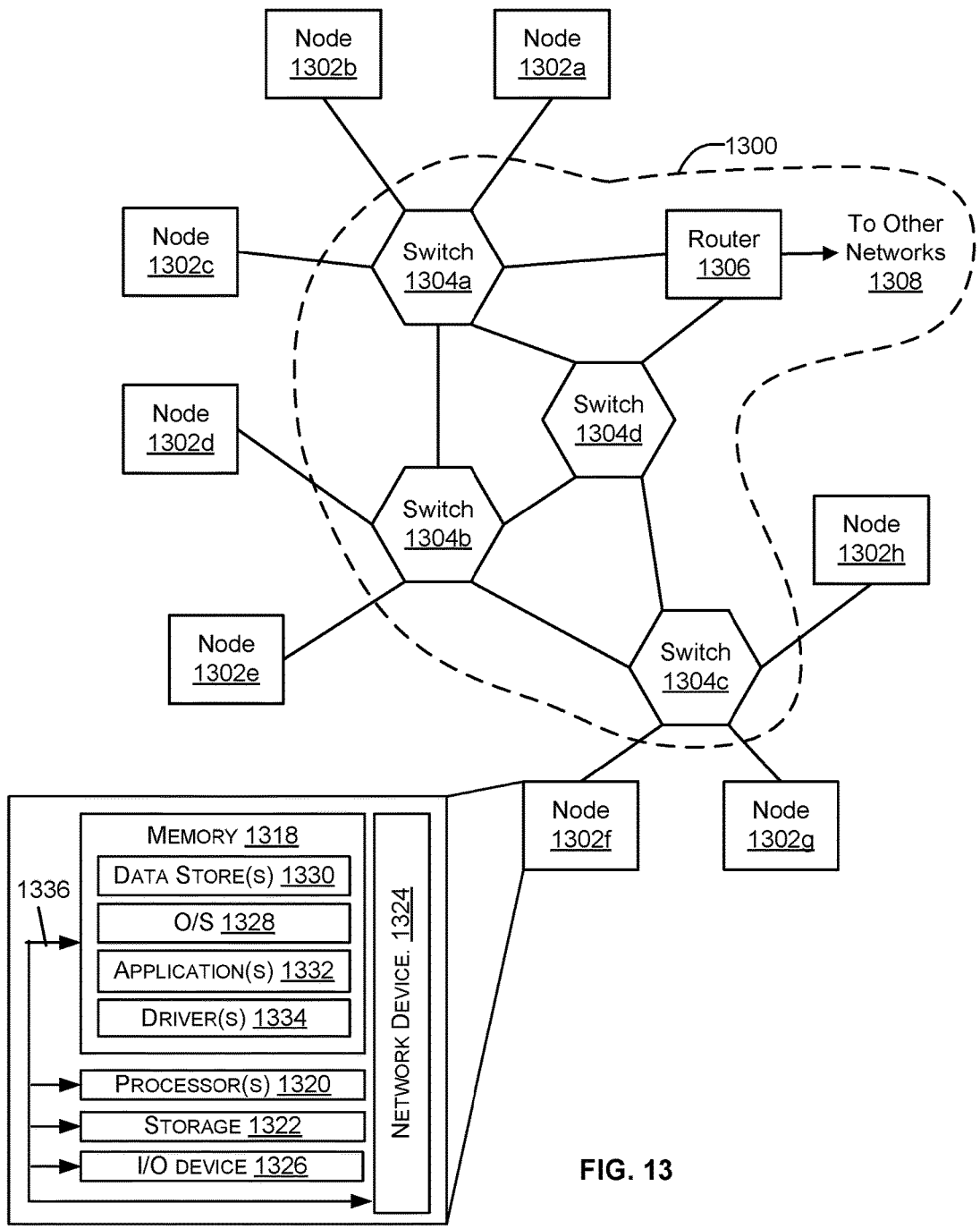
FIG. 13 illustrates an example architecture for features and systems described herein that includes one or more service provider computers and/or a user device connected via one or more networks, according to certain aspects of the disclosure.

FIG. 13 illustrates a network 1300, illustrating various different types of network devices 1200 of FIG. 12, such as nodes comprising the network device, switches and routers. In certain embodiments, the network 1300 may be based on a switched architecture with point-to-point links. As illustrated in FIG. 13, the network 1300 includes a plurality of switches 1304a-1304d, which may be arranged in a network. In some cases, the switches are arranged in a multi-layered network, such as a Clos network. A network device 1200 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1304a-1304d may be connected to a plurality of nodes 1302a-1302h and provide multiple paths between any two nodes.

The network 1300 may also include one or more network devices 1200 for connection with other networks 1308, such as other subnets, LANs, wide area networks (WANs), or the Internet, and may be referred to as routers 1306. Routers use headers and forwarding tables to determine the best path for forwarding the packets, and use protocols such as internet control message protocol (ICMP) to communicate with each other and configure the best route between any two devices.

In some examples, network(s) 1300 may include any one or a combination of many different types of networks, such as cable networks, the Internet, wireless networks, cellular networks and other private and/or public networks. Interconnected switches 1304a-1304d and router 1306, if present, may be referred to as a switch fabric, a fabric, a network fabric, or simply a network. In the context of a computer network, terms "fabric" and "network" may be used interchangeably herein.

Nodes 1302a-1302h may be any combination of host systems, processor nodes, storage subsystems, and I/O chassis that represent user devices, service provider computers or third party computers.

User devices may include computing devices to access an application 1332 (e.g., a web browser or mobile device application). In some aspects, the application 1332 may be hosted, managed, and/or provided by a computing resources service or service provider. The application 1332 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1308. Additionally, the user device(s) may be part of the distributed system managed by, controlled by, or otherwise part of the service provider computer(s) (e.g., a console device integrated with the service provider computers).

The node(s) of FIG. 13 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1332 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1302a-1302h may include at least one memory 1318 and one or more processing units (or processor(s) 1320). The processor(s) 1320 may be implemented in hardware, computer-executable instructions, firmware, or combinations thereof. Computer-executable instruction or firmware implementations of the processor(s) 1320 may include computer-executable or machine-executable instructions written in any suitable programming language to perform the various functions described.

In some instances, the hardware processor(s) 1320 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1318 may store program instructions that are loadable and executable on the processor(s) 1320, as well as data generated during the execution of these programs. Depending on the configuration and type of the node(s) 1302a-1302h, the memory 1318 may be volatile (such as RAM) and/or non-volatile (such as ROM, flash memory, etc.). The memory 1318 may include an operating system 1328, one or more data stores 1330, one or more application programs 1332, one or more drivers 1334, and/or services for implementing the features disclosed herein.

The operating system 1328 may support nodes 1302a-1302h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1328 may also be a proprietary operating system.

The data stores 1330 may include permanent or transitory data used and/or operated on by the operating system 1328, application programs 1332, or drivers 1334. Examples of such data include web pages, video data, audio data, images, user data, and so on. The information in the data stores 1330 may, in some implementations, be provided over the network(s) 1308 to user devices 1304. In some cases, the data stores 1330 may additionally or alternatively include stored application programs and/or drivers. Alternatively or additionally, the data stores 1330 may store standard and/or proprietary software libraries, and/or standard and/or proprietary application user interface (API) libraries. Information stored in the data stores 1330 may be machine-readable object code, source code, interpreted code, or intermediate code.

The drivers 1334 include programs that may provide communication between components in a node. For example, some drivers 1334 may provide communication between the operating system 1328 and additional storage 1322, network device 1324, and/or I/O device 1326. Alternatively or additionally, some drivers 1334 may provide communication between application programs 1332 and the operating system 1328, and/or application programs 1332 and peripheral devices accessible to the service provider computer. In many cases, the drivers 1334 may include drivers that provide well-understood functionality (e.g., printer drivers, display drivers, hard disk drivers, Solid State Device drivers). In other cases, the drivers 1334 may provide proprietary or specialized functionality.

The service provider computer(s) or servers may also include additional storage 1322, which may include removable storage and/or non-removable storage. The additional storage 1322 may include magnetic storage, optical disks, solid state disks, flash memory, and/or tape storage. The additional storage 1322 may be housed in the same chassis as the node(s) 1302a-1302h or may be in an external enclosure. The memory 1318 and/or additional storage 1322 and their associated computer-readable media may provide non-volatile storage of computer-readable instructions, data structures, program modules, and other data for the computing devices. In some implementations, the memory 1318 may include multiple different types of memory, such as SRAM, DRAM, or ROM.

The memory 1318 and the additional storage 1322, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1318 and the additional storage 1322 are examples of computer storage media. Additional types of computer storage media that may be present in the node(s) 1302a-1302h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1302a-1302h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1302a-1302h may also include I/O device(s) 1326, such as a keyboard, a mouse, a pen, a voice input device, a touch input device, a display, speakers, a printer, and the like. The node(s) 1302a-1302h may also include one or more communication channels 1336. A communication channel 1336 may provide a medium over which the various components of the node(s) 1302a-1302h can communicate. The communication channel or channels 1336 may take the form of a bus, a ring, a switching fabric, or a network.

The node(s) 1302a-1302h may also contain network device(s) 1324 that allow the node(s) 1302a-1302h to communicate with a stored database, another computing device or server, user terminals and/or other devices on the network (s) 1300. The network device(s) 1324 of FIG. 13 may include similar components discussed with reference to the network device 1200 of FIG. 12.

In some implementations, the network device 1324 is a peripheral device, such as a PCI-based device. In these implementations, the network device 1324 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1208 may implement NVMe, and the network device 1324 may be connected to a computing system using a PCIe interface.

A PCI-based device may include one or more functions. A "function" describes operations that may be provided by the network device 1324. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1324 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, FIG. 13, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Moreover, any combination of the above-described elements in all possible variations thereof is encompassed by the disclosure unless otherwise indicated herein or otherwise clearly contradicted by context.

What is claimed is:

1. A network device, comprising:
   a memory storing a forwarding table comprising forwarding address storage locations;
   processing logic coupled to the memory, the processing logic configured to:
   receive network packets each including a respective one of addresses, wherein the addresses correspond to respective first entropy values;
   generate lookup values for each of the network packets, wherein each of the lookup values is deterministically generated by exclusively ORing a first portion of the address of the corresponding network packet with a second portion of the address of the corresponding network packet;
   wherein the lookup values correspond to a second entropy value, the second entropy value indicating that the lookup values have a higher degree of disorder than a degree of disorder indicated by the first entropy value of the addresses of the network packets; and
   select, for each of the network packets, one of the forwarding address storage locations from the forwarding table, the selecting based on the lookup value corresponding to each of the network packets, including searching a plurality of segments of the forwarding table, each segment corresponding to a respective lookup value.

2. The network device of claim 1, wherein the first portion is included in the second portion.

3. The network device of claim 1, wherein the forwarding table includes a plurality of sections each including the segments; and
   the selecting the forwarding address includes searching each of the plurality of sections concurrently.

4. The network device of claim 1, wherein the processing logic is implementing by a processor, application specific integrated circuit (ASIC), digital signal processor (DSP), system on a chip (SoC), field programmable gate array (FPGA), or programmable logic device (PLD).

5. A network device, comprising:
   a memory storing a forwarding table comprising forwarding address storage locations;
   processing logic coupled to the memory and the processing logic configured to:
   receive network packets each including a respective one of addresses, wherein the addresses correspond to respective first entropy values;
   generate lookup values each corresponding to one of the network packets,
   wherein each of the lookup values is deterministically generated based on the address of the corresponding network packet;
   wherein the lookup values correspond to respective second entropy values, the second entropy value indicating that the lookup values have a higher degree of disorder than a degree of disorder indicated by the first entropy value of the addresses of the network packets; and select, for each of the network packets, one of the forwarding address storage locations from the forwarding table, the selecting based on the lookup value corresponding to each of the network packets.

6. The network device of claim 5, wherein the addresses are sequential and the lookup values are non-sequential.

7. The network device of claim 5, wherein the generating the lookup values includes transforming the corresponding address based on a first portion of the corresponding address exclusively ORed with a second portion of the corresponding address.

8. The network device of claim 7, wherein the first portion is included in the second portion.

9. The network device of claim 8, wherein the processing logic is configured to:

select one of a plurality of sizes for the first portion depending on a size of the corresponding address.

10. The network device of claim 5, wherein the generating the lookup values comprises transforming a number of bits of each of the addresses, the number of bits being less than a total number of bits of each address; and wherein remaining non-transformed bits of each of the addresses are appended to the corresponding lookup value, the remaining non-transformed bits being the total number of bits less the number of bits used for the transforming.

11. The network device of claim 5, wherein the processing logic is configured to generate a respective subunit of each of the lookup values each corresponding to a portion of each corresponding one of the addresses, wherein the portion is one of several portions of each of the addresses; and wherein the forwarding table includes a plurality of segments each corresponding to a respective portion of each of the addresses.

12. The network device of claim 11, wherein the portion is a first portion of the address; and the generating the lookup value includes generating a lookup value for a second portion of an address by truncating bits from a subunit of a lookup value generated for the first portion of the address to a subunit of the lookup value generated for the second portion.

13. The network device of claim 11, wherein the selecting a forwarding address includes selecting, from each segment of the forwarding table, a respective portion of the forwarding address for each of the network packets, wherein the selecting includes locating portions of the forwarding address respectively from a first segment and a second segment through use of an identifier that identifies the first segment that is stored corresponding to the second segment.

14. The network device of claim 11, wherein a length of the portion is 32 bits or less.

15. The network device of claim 5, wherein the generating of one of the lookup values is further based on virtual routing and forwarding information of the corresponding network packet.

16. The network device of claim 15, wherein generating the lookup value includes exclusively ORing the virtual routing and forwarding information with the at least a portion of the address.

17. A method, comprising:

receiving, at a device, network packets, wherein each of the network packets includes a respective address, the addresses corresponding to respective first entropy values;

generating, for each of the addresses, a respective lookup value, the lookup values corresponding to respective second entropy values, the second entropy values indicating that the lookup values have a higher degree of disorder than a degree of disorder indicated by the first entropy value; and selecting, from a forwarding table, a forwarding address storage location for each of the network packets, the selecting based on the generated lookup value.

18. The method of claim 17, further comprising:

determining that a size of each of the addresses meets a threshold; and upon determining that a size of one of the addresses meets the threshold, sequentially generating each of the lookup values for a respective portion of the one of the addresses, the portion equaling the threshold.

19. The method of claim 18, wherein the sequentially generating the lookup values includes exclusively ORing sequential portions of the address, the number of exclusive OR operations being based on the number of portions.

20. The method of claim 19, wherein the selecting includes selecting a portion of a reference to the forwarding address storage location from a respective segment of the forwarding table, each portion of the forwarding address corresponding to a portion of the address.

* * * * *